(12) United States Patent
Baba et al.

(10) Patent No.: US 7,515,370 B2
(45) Date of Patent: Apr. 7, 2009

(54) RECORDER AND CASSETTE CONTAINING RECORDING MEDIUM

(75) Inventors: Nobuaki Baba, Tokyo (JP); Tatsuo Tsujibayashi, Kanagawa (JP); Mitsuru Harada, Kanagawa (JP); Mutsuko Ochiai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1042 days.

(21) Appl. No.: 10/485,810

(22) PCT Filed: Jun. 6, 2003

(86) PCT No.: PCT/JP03/07206

§ 371 (c)(1),
(2), (4) Date: Feb. 4, 2004

(87) PCT Pub. No.: WO03/105147

PCT Pub. Date: Dec. 18, 2003

(65) Prior Publication Data

US 2005/0117881 A1   Jun. 2, 2005

(30) Foreign Application Priority Data

Jun. 6, 2002   (JP) .............................. 2002-166055

(51) Int. Cl.
*G11B 15/04* (2006.01)
*G11B 23/02* (2006.01)
*G11B 15/00* (2006.01)

(52) U.S. Cl. ........................... 360/60; 360/94; 360/132

(58) Field of Classification Search ........................ None
See application file for complete search history.

(56) References Cited

U.S. PATENT DOCUMENTS

| 4,903,159 A | 2/1990 | Kawano |
| 5,638,239 A * | 6/1997 | Ohgi ........................... 360/132 |
| 6,490,132 B1 * | 12/2002 | Kano et al. .................. 360/132 |

FOREIGN PATENT DOCUMENTS

| EP | 0 312 106 | 4/1989 |
| EP | 0 382 193 | 8/1990 |
| EP | 0 561 144 | 9/1993 |
| EP | 1 052 642 | 11/2000 |
| EP | 1 061 519 | 12/2000 |

(Continued)

*Primary Examiner*—Jason C Olson
(74) *Attorney, Agent, or Firm*—Frommer Lawrence & Haug LLP; William S. Frommer; Thomas F. Presson

(57) ABSTRACT

A recording apparatus capable of recording data either in a current-used format or a new format on a recording medium accommodated in a current-used tape cassette or a new tape cassette. The recording apparatus comprises a first writing prohibition detection switch to be inserted to an discrimination hole formed on both cassettes and receded in accordance with an open/close state of a writing prohibition discrimination hole provided on the current-used cassette, a second writing prohibition detection switch to be receded in accordance with an open/close state of a writing prohibition discrimination hole formed in the new tape cassette, and a cassette type detection switch to be inserted to an discrimination hole formed in the new tape cassette and receded by a side surface of the current-used cassette. A control circuit discriminates a new tape cassette from the current-used tape cassette.

5 Claims, 12 Drawing Sheets

FOREIGN PATENT DOCUMENTS

| | | |
|---|---|---|
| JP | 1-105374 | 4/1989 |
| JP | 05-325488 | 12/1993 |
| JP | 08-124350 | 5/1996 |
| JP | 2545885 | 8/1996 |
| JP | 11-185441 | 7/1999 |
| JP | 2000-076824 | 3/2000 |
| JP | 2000 100120 | 4/2000 |
| JP | 2000 100121 | 4/2000 |
| JP | 2003051174 A * | 2/2003 |
| WO | WO 93/21633 | 10/1993 |
| WO | WO 00 19429 | 4/2000 |

* cited by examiner

FIG. 11

| ADDRESS | DATA |
|---|---|
| A A A A | $a_7\ a_6\ a_5\ a_4\ a_3\ a_2\ a_1\ a_0$ |
| B B B B | $b_7\ b_6\ b_5\ b_4\ b_3\ b_2\ b_1\ b_0$ |

$a_0$ : 1 PROHIBIT WRITING
$a_0$ : 0 PERMIT WRITING
$b_0$ : 1 NEW FORMAT
$b_0$ : 0 CURRENT-USED FORMAT

RECORDER AND CASSETTE CONTAINING RECORDING MEDIUM

TECHNICAL FIELD

The present invention relates to a recording apparatus for recording data to a cassette, such as a magnetic tape cassette accommodating a magnetic tape as a recording medium, and a recording medium accommodation cassette used therefor.

The present invention particularly relates to a recording medium for discriminating two types of cassettes for recording data in different formats on a recording medium and performing data recording processing in accordance with the discriminated cassette, and a recording medium accommodation cassette used therefor.

BACKGOUND ART

In a recording/reproducing apparatus for recording data on a recording medium, such as a magnetic tape, accommodated in a recording medium accommodation cassette (hereinafter, simplified to a cassette) and reproducing data from the recording medium, it is preferable in terms of development costs to divert a recording/reproducing apparatus and a cassette of a current-used format as much as possible when developing a recording/reproducing apparatus for recording data in a new format on a recording medium and enabling to record and reproduce a magnetic tape recorded in the current-used format by using the recording/reproducing apparatus.

For example, when a size of a cassette for accommodating a magnetic tape for recording in a new format is made the same as that of a cassette for accommodating a magnetic tape for recording in the current-used format, costs on developing a cassette for accommodating a recording a magnetic tape for recording in the new format can be reduced, and a workload in developing a new recording/reproducing apparatus can be reduced.

When a current-used cassette (a first cassette) and a new cassette (a second cassette) are made to be the same size in a recording/reproducing apparatus capable of recording and reproducing the both, a mechanism for discriminating the new cassette from the current-used cassette becomes necessary in the new recording/reproducing apparatus. Thus, a space for this discrimination mechanism becomes necessary, which is liable to be an obstacle in diverting a current-used recording/reproducing apparatus.

Also, when the new cassette has the same size as that of the current-used cassette, it is necessary to surely prevent erroneous erase of data recorded in a recording medium accommodated in a new cassette by a current-used recording/reproducing apparatus for recording data in a recording medium accommodated in a current-used cassette and reproducing data from the recording medium. Therefore, a new recording/reproducing apparatus is required to be able to discriminate a new cassette, by which data recorded on a recording medium is not erroneously erased by a current-used recording/reproducing apparatus.

DISCLOSURE OF THE INVENTION

An object of the present invention is to provide a recording apparatus capable of discriminating the first cassette from the second cassette having the same shape and size as those of the first cassette, recording data in a first format in a first recording medium accommodated in the first cassette, and recording data in a second format in a second recording medium accommodated in the second cassette.

Another object of the present invention is to provide a recording apparatus capable of using both of the first cassette and the second cassette as explained above, wherein data recorded in one format on a recording medium is not erroneously erased by the other format.

Still another object of the present invention is to make such a recording apparatus compact.

Furthermore, the present invention is to provide a recording medium accommodation cassette applicable to the above recording apparatus.

According to a first aspect of the present invention, there is provided a recording apparatus for discriminating whether a set cassette accommodating a recording medium is in a first cassette for recording data in a first format or a second cassette for recording data in a second format, detecting whether it is possible to record data on said recording medium accommodated in the discriminated cassette, and recording data in a format in accordance with the discriminated cassette on said recording medium when recordable, comprising a cassette type detection means for detecting whether said first cassette or said second cassette; a first writing prohibition detection means for detecting whether or not to permit to record data in the first format on said recording medium accommodated in said first cassette or said second cassette; a second writing prohibition detection means for detecting whether or not to record data in the second format on said recording medium accommodated in said first cassette or second cassette; a control means; and a data recording means.

The control means discriminates whether a cassette set in the recording apparatus is said first cassette or said second cassette from a detection signal of said cassette type detection means, performing data recording on said recording medium in the first format via said data recording means in the case where a detection signal of said first writing prohibition means permits to write data on said recording medium when said first cassette is set, and performing data recording on said recording medium in the second format via said data recording means in the case where a detection signal of said second writing prohibition means permits to write data on said recording medium when said second cassette is set.

According to a second aspect of the present invention, there is provided a recording medium accommodation cassette, having the same dimensions as those of a first recording medium accommodation cassette for accommodating a recording medium to be recorded data in a first format, characterized by comprising a first discrimination hole provided at the same position as a writing prohibition setting means provided to said first cassette, having a writing prohibition state; and a discrimination means for discriminating from said first cassette and indicating permission and prohibition of writing to said recording medium accommodation cassette.

BRIEF DESCRIPTION OF DRAWINGS

FIG. 2A and FIG. 2B are sectional views as an example of a relationship of a partial section of a tape cassette (a current-used tape cassette) accommodating a magnetic tape wherein data is recorded in a current-used format and a detection switch contacting the current-used tape cassette in a first embodiment of the present invention, wherein FIG. 2A is a view showing a state of permitting data writing in the current-used tape cassette, and FIG. 2B is a view showing a state of prohibiting data writing in the current-used tape cassette.

FIG. 3A and FIG. 3B are sectional views as an example of a relationship of a partial section of a tape cassette (a new tape cassette) accommodating a magnetic tape 51 wherein data is recorded in a new (second) format and a detection switch contacting the new tape cassette, wherein FIG. 3A shows a state of permitting data writing in the new tape cassette, and FIG. 3B is a view showing a state of prohibiting data writing in the new tape cassette.

FIG. 6A and FIG. 6B are sectional views showing an example of an arrangement relationship of a partial section of the new tape cassette, a writing prohibition detection switch, a light emission element and light reception elements, wherein FIG. 6A is a view showing a state of permitting data writing in the new tape cassette, and FIG. 6B is a view showing a state of prohibiting data writing in the new tape cassette.

FIG. 7A and FIG. 7B are sectional views showing an example of an arrangement relationship of a partial section of the new tape cassette, a writing prohibition detecting switch, a light emission element and light reception elements, wherein FIG. 7A is a view showing a state of permitting data writing to the current-used tape cassette, and FIG. 7B is a view showing a state of prohibiting data writing to the current-used tape cassette.

FIG. 11 is a view showing data in a specific address in a maker option region on an IC memory in the third embodiment of the present invention.

BEST MODE FOR CARRYING OUT THE INVENTION

Below, best modes for carrying out the present invention will be explained with reference to the drawings.

First Embodiment

A first embodiment of a recording/reproducing apparatus of the present invention will be explained with reference to FIG. 1, FIG. 2A, FIG. 2B, FIG. 3A, FIG. 3B and FIG. 4.

Figure 1:
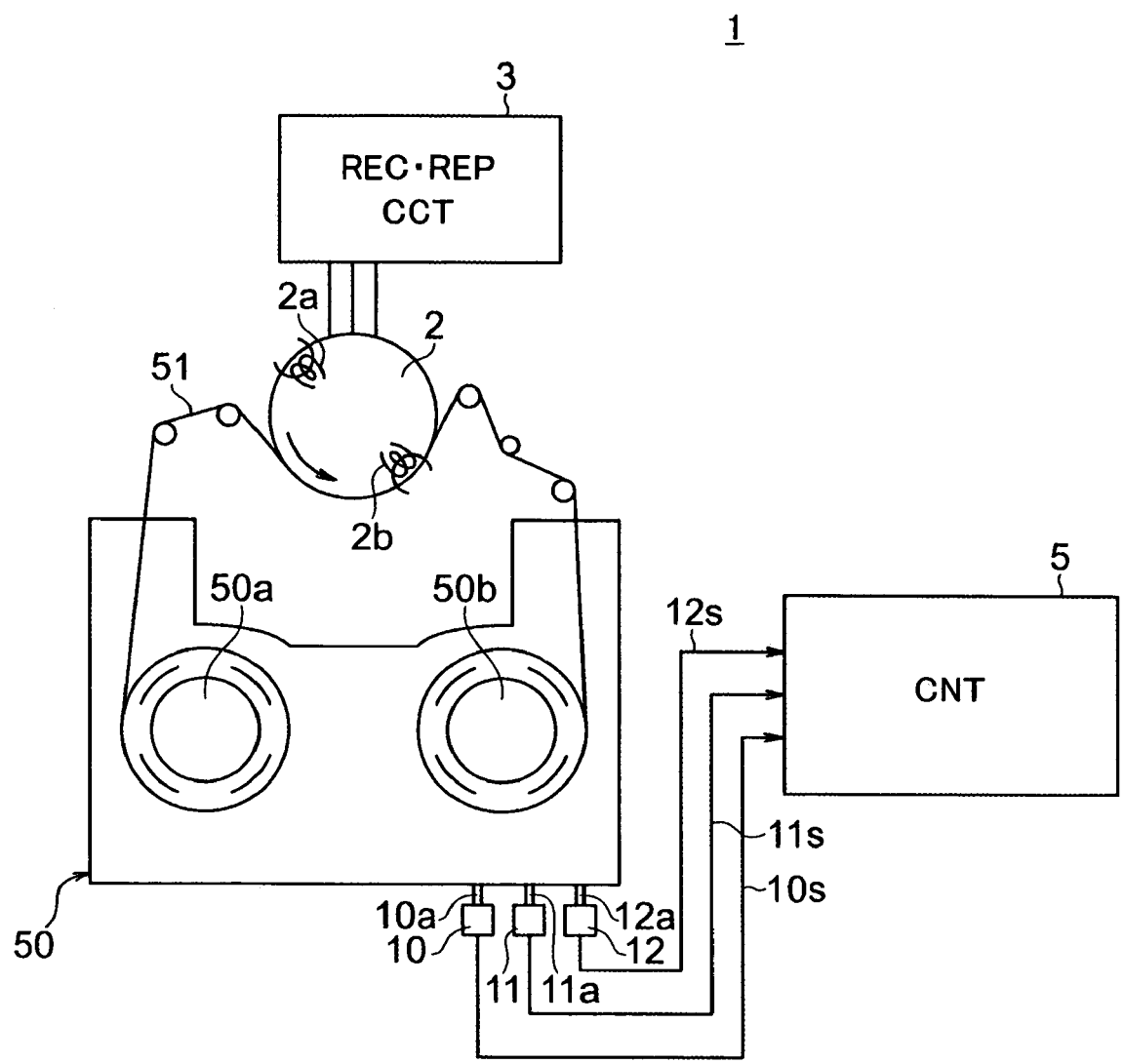
FIG. 1 is a view of the schematic configuration of a recording/reproducing apparatus according to an embodiment of the present invention.

FIG. 1 is a view showing the schematic configuration of a recording/reproducing apparatus according to an embodiment of the present invention.

Figure 2A:
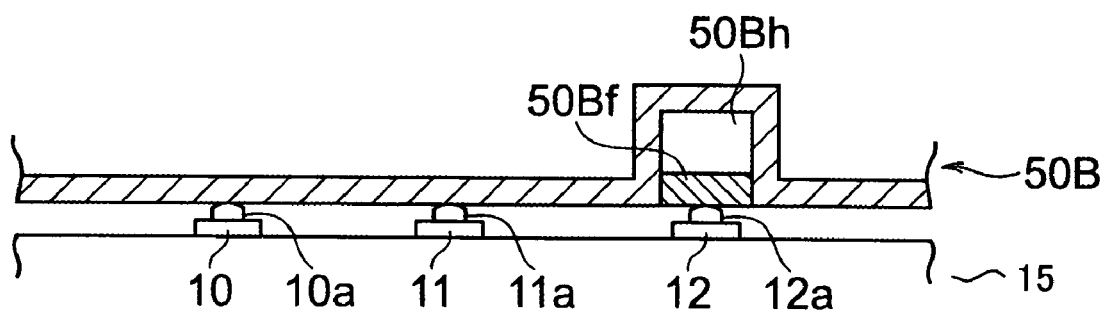
Figure 2B:
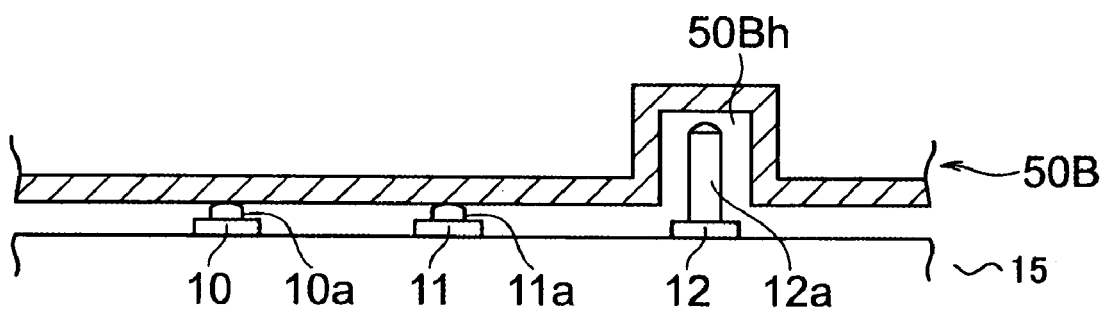

FIG. 2A and FIG. 2B are sectional views as an example of a relationship of a partial section of a tape cassette 50B (a current-used tape cassette 50B) accommodating a magnetic tape 51 wherein data is recorded in a current-used (first) format and a detection switches 10, 11 and 12 contacting the current-used tape cassette 50B. FIG. 2A is a view showing a state of permitting data writing in the current-used tape cassette 50B, and FIG. 2B is a view showing a state of prohibiting data writing in the current-used tape cassette.

The tape cassette 50B accommodating the magnetic tape 51 wherein data is recorded in the current-used format will be called a current-used tape cassette 50B.

Figure 3A:
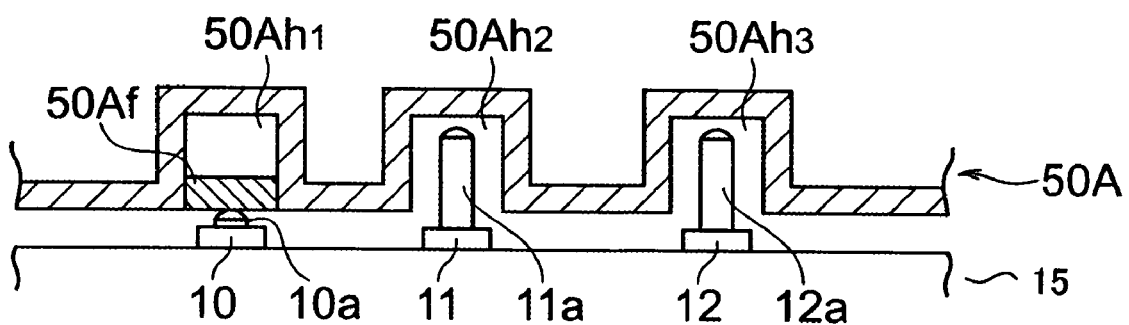
Figure 3B:
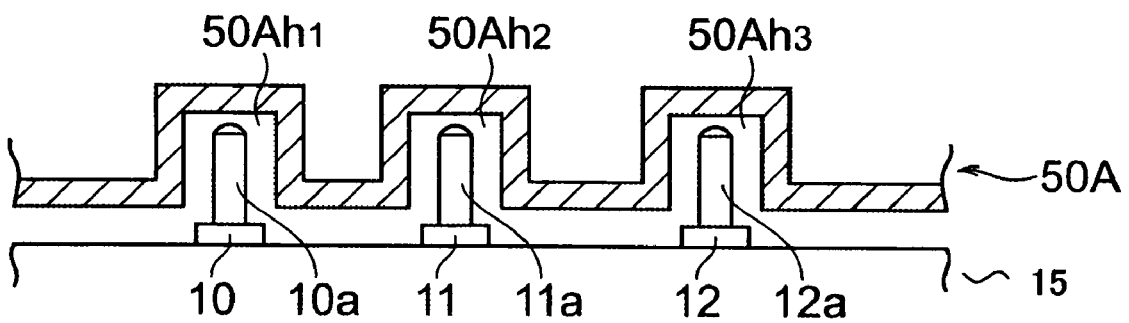

FIG. 3A and FIG. 3B are sectional views as an example showing a relationship of a partial section of a tape cassette 50A (a new tape cassette 50A) accommodating a magnetic tape 51 wherein data is recorded in a new (second) format and a detection switches 10, 11 and 12 contacting the new tape cassette 50A. FIG. 3A shows a state of permitting data writing in the new tape cassette 50A, and FIG. 3B is a view showing a state of prohibiting data writing in the new tape cassette 50A.

The recording/reproducing apparatus 1 shown in FIG. 1 is mounted with a tape cassette 50 accommodating two reels 50a and 50b wound with the magnetic tape 51, and the recording/reproducing apparatus 1 performs recording of data on the magnetic tape 51 or reading (reproducing) of data from the magnetic tape 51 by running the magnetic tape 51.

Also, it is assumed that the recording/reproducing apparatus 1 records data on the magnetic tape 51, data read from the magnetic tape 51 comprises data in the first format and data in the second format being different to each other, the first format is the conventionally existing current-used format and the second format is the newly created new format.

The tape cassette 50B (current-used tape cassette 50B) accommodating the magnetic tape 51 wherein data is recorded in the current-used format and the tape cassette 50A (new tape cassette 50A) accommodating the magnetic tape 51 wherein data is recorded in the new format correspond to the tape cassette 50. The current-used tape cassette 50B and the new tape cassette 51A have the same outer appearance and the same dimensions (size).

In FIG. 1, the recording/reproducing apparatus 1 comprises a rotation drum 2, a magnetic recording/reproducing circuit 3, a control circuit 5, a second writing prohibition detection switch 10, a cassette type detection switch 11 and a first writing prohibition detection switch 12.

The rotation drum 2 is provided with two magnetic heads 2a and 2b arranged along the circumference away by 180° from each other and rotated by a not shown motor. The magnetic tape 51 contacts the outer circumference of the rotation drum while running and data is written on the magnetic tape 51 by the magnetic heads 2a and 2b in accordance with a drive current output from the magnetic recording/reproducing circuit 3, or data recorded on the magnetic tape 51 is read by the magnetic heads 2a and 2b and reproduced by the magnetic recording/reproducing circuit 3.

The magnetic recording/reproducing circuit 3 outputs a drive current in accordance with data to be recorded on the magnetic tape 51 or reproduce data recorded on the magnetic tape 51 from signals detected by the magnetic heads 2a and 2b.

The detection switches 10, 11 and 12 are arranged so as to be able to contact a side surface of the tape cassette 50 and placed on a base 15 of the recording/reproducing apparatus 1 at predetermined intervals. The detection switches 10, 11 and 12 are respectively provided with detection pins 10a, 11a and 12a provided so as to be able to be taken in and out from the detection switches 10, 11 and 12 and output detection signals 10s, 11s and 12s to the control circuit 5 in accordance with the in/out state of the detection pins 10a, 11a and 12a.

While the details will be explained later on, the first writing prohibition detection switch 12 is a switch for detecting permission or prohibition of data writing in the current-used format on the magnetic tape 51 accommodated in the current-used tape cassette 50B. The second writing prohibition detection switch 10 is a switch for detecting permission or prohibition of data writing in new format on the magnetic tape 51 accommodated in the new tape cassette 50A. The cassette type detection switch 11 is a switch for detecting whether a cassette is a new tape cassette 50A or a current-used tape cassette 50B.

The control circuit 5 totally controls operations of the recording/reproducing apparatus 1. For example, the control circuit 5 controls operations of the magnetic recording/reproducing circuit 3, a running system of the magnetic tape 51 and a drive system of the rotation drum 2, etc. Also, the control circuit 5 receives as inputs the detection signals 10$s$, 11$s$ and 12$s$ of the detection switches 10, 11 and 12 and controls to permit or prohibit data writing on the magnetic tape 51 accommodated in the tape cassette 50 (a current-used tape cassette 50B or a new tape cassette 50A) based on the states of the detection signals 10$s$, 11$s$ and 12$s$.

As shown in FIG. 2A and FIG. 2B, the tape cassette 50B (current-used tape cassette 50B) wherein data is recorded in the current-used format on the magnetic tape 51 is provided with a writing prohibition discrimination hole 50Bh on a side surface contacting (positioned by) the first writing prohibition detection switch 12.

The writing prohibition discrimination hole 50Bh has a cap 50Bf for opening and closing the writing prohibition discrimination hole 50Bh. In the case of prohibiting data writing for prohibiting data writing on the magnetic tape 51 accommodated in the current-used tape cassette 50B (hereinafter, referred to as "data writing to the current-used tape cassette" for simplification), the cap Bf opens the writing prohibition discrimination hole 50Bh as shown in FIG. 2B, while in the case of permitting data writing to the current-used tape cassette 50B, the cap 50Bf closes the writing prohibition discrimination hole 50Bh as shown in FIG. 2A. The cap 50Bf may be anything as far as it prohibits insertion of the pin 12$a$ of the first writing prohibition detection switch 12 to the writing prohibition discrimination hole 50Bh and may be, for example, a tape, a putty for plugging the writing prohibition discrimination hole 50Bh or a plastic plug.

As shown in FIG. 2A, when the current-used tape cassette 50B is in the state of permitting writing, the detection pin 12$a$ of the first writing prohibition detection switch 12 contacts the cap 50Bf and is pressed so as to be in a state of not protruding (receded state) from the first writing prohibition detection switch 12. As shown in FIG. 2B, in the writing prohibition state, the detection pin 12$a$ of the first writing prohibition detection switch 12 extends to be inserted into the writing prohibition discrimination hole 50Bh, and the detection pin 12$a$ becomes a projected state (a protruded state) from the first writing prohibition detection switch 12.

The side surface of the current-used tape cassette 50B that contacts the second writing prohibition detection switch 10 and the cassette type detection switch 11 is flat. Therefore, the detection pin 10$a$ of the second writing prohibition detection switch 10 and the detection pin 11$a$ of the cassette type detection switch 11 are in the receded state regardless of being permitted or prohibited to write to the current-used tape cassette 50B.

As shown in FIG. 3A and FIG. 3B, the new tape cassette 50A accommodating the magnetic tape 51 wherein data is recorded in a new format is provided with a third discrimination hole 50Ah 3 on a side surface positioned at (contacting) the first writing prohibition detection switch 12, a second discrimination hole 50Ah 2 on a side surface contacting the cassette type detection switch 11, and a first discrimination hole 50Ah 1 on a side surface contacting the second writing prohibition detection switch 10.

The outer appearance, size and material of the new tape cassette 50A are the same as those of the 50B. For example, the 50B and the new tape cassette 50A are made by a plastic resin.

The third discrimination hole 50Ah 3 is formed at the same position as the writing prohibition discrimination hole 50Bh of the current-used tape cassette 50B illustrated in FIG. 2A and FIG. 2B. Since the third discrimination hole 50Ah 3 of the new tape cassette 50A is always open, the new tape cassette 50A is in the data writing prohibited state in the same way as data writing prohibited state of the current-used tape cassette 50B. Accordingly, when a new tape cassette 50A is mounted in the current-used recording/reproducing apparatus for recording and reproducing current-used tape cassette 50B, a control circuit 5 in the current-used recording/reproducing apparatus always identifies that the new tape cassette 50A is in the writing prohibited state.

The detection pin 11$a$ of the cassette type detection switch 11 is inserted to the second discrimination hole 50Ah 2. Thus, when the detection signal 11$s$ of the cassette type detection switch 11 is identified in the control circuit 5, it is possible to discriminate between a current-used tape cassette 50B and a new tape cassette 50A.

The first discrimination hole 50Ah 1 is a hole for identifying prohibition of data writing to the new tape cassette 50A. As shown in FIG. 3A, the first discrimination hole 50Ah 1 is closed with a cap 50Af when prohibited to write data to the new tape cassette 50A. Therefore, the detection pin 10$a$ of the second writing prohibition detection switch 10 contacts the cap 50Af and pressed to be in a receded state in the second writing prohibition detection switch 10. As shown in FIG. 3B, the first discrimination hole 50Ah 1 is open because a cap 50Af does not exist when prohibited to write to the new tape cassette 50A. Therefore, the detection pin 10$a$ of the second writing prohibition detection switch 10 becomes a state of inserted to the first discrimination hole 50Ah 1. The cap 50Af is made by the same material as that of the cap 50B$f$.

Figure 4:
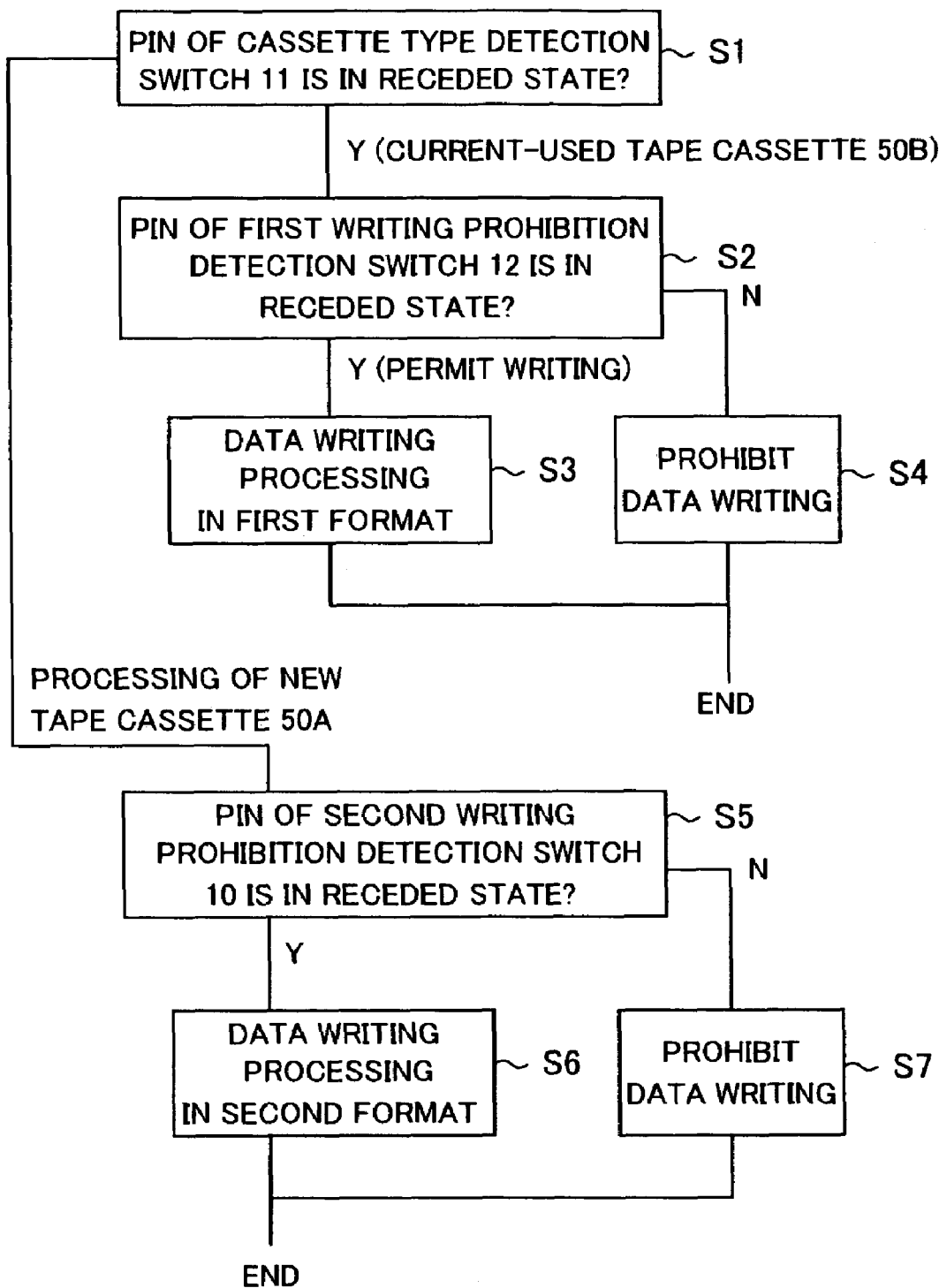
FIG. 4 is a flowchart showing operations of a first embodiment of the present invention.

With reference to FIG. 4, operations of the first writing prohibition detection switch 12, the second writing prohibition detection switch 10, cassette type detection switch 11 and the control circuit 5 will be explained.

Step 1: The control circuit 5 of the recording/reproducing apparatus 1 identifies the tape cassette 50 as a current-used tape cassette 50B when the detection pin 11$a$ of the cassette type detection switch 11 is in the receded state and the signal 11$s$ of the cassette type detection switch 11 is "1", for example, as shown in FIG. 2A and FIG. 2B, inversely, identifies the tape cassette 50 as a new tape cassette 50A when the detection pin 11$a$ of the cassette type detection switch 11 is inserted to the second discrimination hole 50Ah 2 and the signal 11$s$ of the cassette type detection switch 11 is "0" as illustrated in FIG. 3A and FIG. 3B.

Steps 2 to 4: When identifying that the cassette is a current-used tape cassette 50B, the control circuit 5 receives as an input a detection signal 12$s$ of the first writing prohibition detection switch 12, performs writing processing in the current-used (first) format on the magnetic tape 51 accommodated in the current-used tape cassette 50B when the detection pin 12$a$ is in a receded state, while when the detection pin 12$a$ is in an inverse state, prohibits to write on the magnetic tape 51.

Steps 5 to 7: When identifying that the cassette is a new tape cassette 50A, the control circuit 5 receives as an input a detection signal 10$s$ of the second writing prohibition detection switch 10, performs writing processing in the current-used (second) format on the magnetic tape 51 accommodated in the new tape cassette 50A when the detection pin 10a is in a receded state, while when the state of the detection pin 10a is inverse, prohibits to write on the magnetic tape 51. Of course, when a new tape cassette 50A is detected, since the first writing prohibition detection switch 12 indicates to prohibit data writing in a current-used (first) format on the magnetic tape 51, data writing in a current-used format on the magnetic tape 51 is prohibited. Accordingly, even when a new tape cassette 50A is set to the current-used recording/reproducing apparatus, erroneous data writing in the first format is not performed on the magnetic tape 51 accommodated in the new tape cassette 50A.

As explained above, the control circuit 5 controls the magnetic recording/reproducing circuit 3 so that data recording is performed on the magnetic tape 51 in a format in accordance with the cassette discrimination state, that is, in a new (second) format or in a current-used (first) format. The rotation drum of the magnetic recording/reproducing circuit 3 is driven in accordance with the control by the control circuit 5, so that data is recorded in a desired format on the magnetic tape 51.

According to the first embodiment, by providing the third discrimination hole 50Ah 3 on the new tape cassette 50A at the same position as the writing prohibition discrimination hole 50Bh formed on the current-used tape cassette 50B, recorded contents on the magnetic tape 51 set in the new tape cassette 50A is not erroneously erased by the current-used format.

Also, in addition to the third discrimination hole 50Ah 3, by providing a second discrimination hole 50Ah 2 for enabling discrimination from a current-used tape cassette 50B, a first discrimination hole 50Ah 1 for setting permission or prohibition of data writing in the second format on the new tape cassette 50A, a cap 50Af for opening and closing the first discrimination hole 50Ah 1, and providing on the base 15 of the recording/reproducing apparatus 1 detection switches 10, 11 and 12 for detecting states of the discrimination holes 50Ah 1, 50Ah 2 and 50Ah 3, it is possible to record in the current-used format on the current-used tape cassette 50B and to record data in the new (second) format in the new tape cassette 50A.

Second Embodiment

A second embodiment of a recording/reproducing apparatus of the present invention will be explained with reference to FIG. 5, FIG. 6A, FIG. 6B, FIG. 7A, FIG. 7B and FIG. 8.

Figure 5:
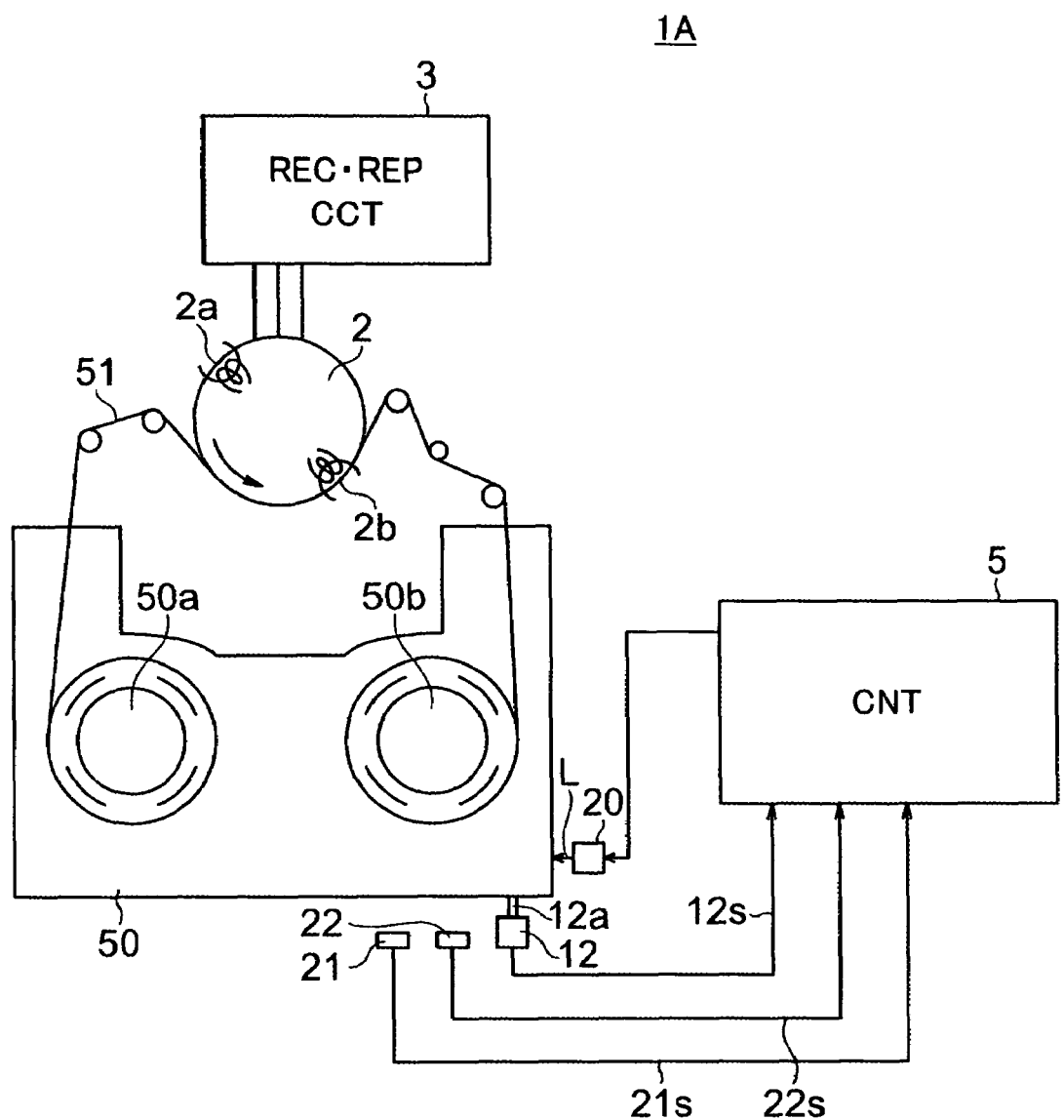
FIG. 5 is a view showing the schematic configuration of a recording/reproducing apparatus according to a second embodiment.

FIG. 5 is a view showing the schematic configuration of the recording/reproducing apparatus according to the second embodiment of the present invention. In FIG. 4, same reference numbers are used for the same components as those in the recording/reproducing apparatus 1 according to the first embodiment.

Different points of the recording/reproducing apparatus 1A of the second embodiment shown in FIG. 5 from the recording/reproducing apparatus 1 according to the first embodiment illustrated in FIG. 1 are that the recording/reproducing apparatus 1A does not have the second writing prohibition detection switch 10 and the cassette type detection switch 11, but has only a writing prohibition detection switch 12 and is provided with a light emission element and light reception elements 21 and 22.

The light emission element 20, the light reception elements 21 and 22 and the writing prohibition detection switch 12 are provided on the base 15 of the recording/reproducing apparatus 1A at positions illustrated in FIG. 6A, FIG. 6B, FIG. 7A and FIG. 7B.

The writing prohibition detection switch 12 is a switch for detecting whether it is permitted or prohibited to write data in a current-used format on the magnetic tape 51 accommodated in the current-used tape cassette 50B in the same way as in the case of the first embodiment.

The light reception element 21 is an element for detecting whether it is permitted or prohibited to write data in a new format on the magnetic tape 51 accommodated in the new tape cassette 50C as same as the second writing prohibition detection switch 10. The second light reception element 22 is an element for discriminating between the current-used tape cassette 50B and the new tape cassette 50C as same as the cassette type detection switch 11. Namely, in the recording/reproducing apparatus 1A of the second embodiment, instead of the second writing prohibition detection switch 10 and the cassette type detection switch 11, permission or prohibition of data writing in the second format and discrimination of cassettes are detected optically.

The light emission element 20 is composed of a light emitting diode and laser, etc. Below, a case of a light emitting diode (LED) as the light emission element 20 will be explained. Of course, a laser can be also used as the light emission element 20. The light emission element 20 is arranged at a predetermined position on the tape cassette 50 (a current-used tape cassette 50B or a new tape cassette 50C) and emits an LED light L to the tape cassette 50. The light emission element 20 is driven by a control device 5.

The light reception elements 21 and 22 are arranged at predetermined positions on the tape cassette 50. When the tape cassette 50 has a higher format (in the case of the new tape cassette 50C), one of the light reception elements 21 and 22 receives an LED light L output from the light emission element 20. Which of the light reception elements 21 and 22 receives the LED light L is decided in accordance with a writing prohibition state of the new tape cassette 50C. Note that a configuration example of the new tape cassette 50C will be explained later on.

When the light reception elements 21 and 22 receive the LED light L, it is converted to an electric signal, and detection signals 21s and 22s are respectively output to the control circuit 5.

Figure 6A:
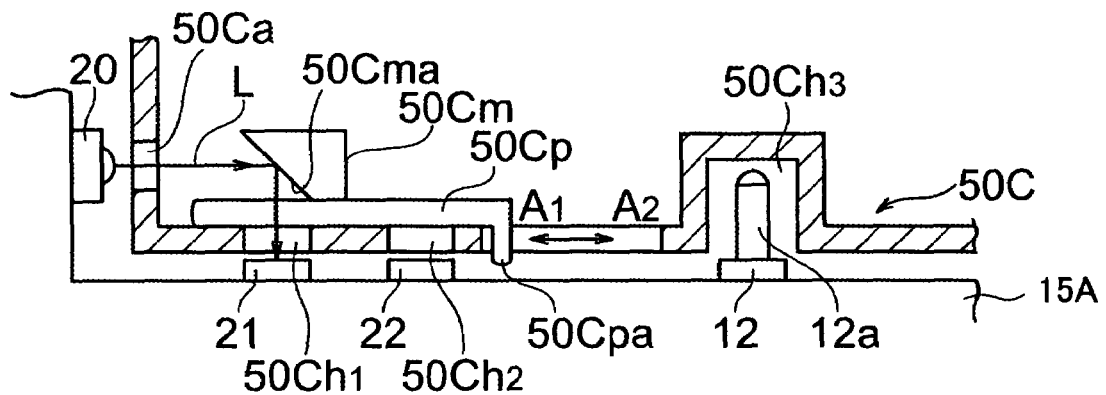
Figure 6B:
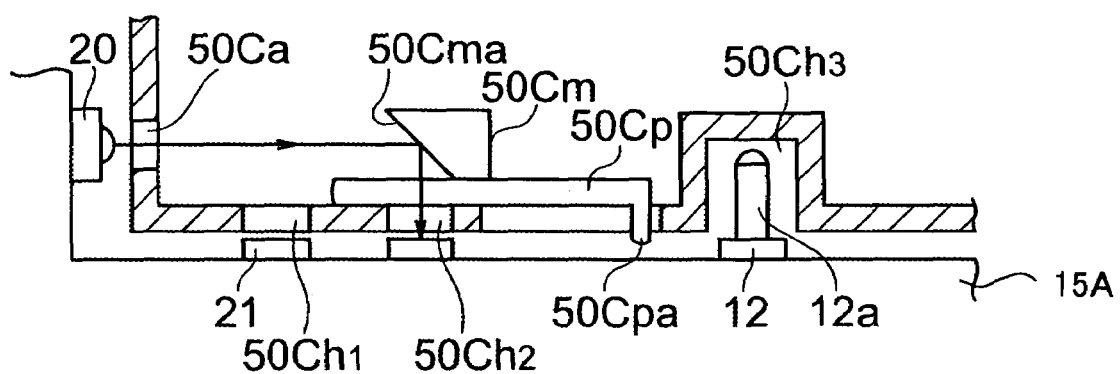

FIG. 6A and FIG. 6B are sectional views showing an example of an arrangement relationship of a partial section of the new tape cassette 50C, a writing prohibition detection switch 12, a light emission element 20 and light reception elements 21 and 22, wherein FIG. 6A is a view showing a state of permitting data writing to the new tape cassette 50A, and FIG. 6B is a view showing a state of prohibiting data writing to the new tape cassette 50A.

As shown in FIG. 6A and FIG. 6B, the new tape cassette 50C is provided with an discrimination hole 50Ch 3 on a side surface contacting the first writing prohibition detection switch 12. Also, a light incident hole 50Ca formed on a side surface facing to the light emission element 20, a first emission hole 50Ch 1 formed on a side surface facing to the light reception element 21, a second emission hole 50Ch 2 formed on a side surface facing to the light reception element 22, and a slide member 50Cp for sliding a reflection member 50Cm are provided.

The new tape cassette 50C other than the light incident hole 50Ca, the first emission hole 50Ch 1 and the second emission hole 50Ch 2 provided on the new tape cassette 50C is formed, for example, by a plastic resin which is opaque.

Figure 7A:
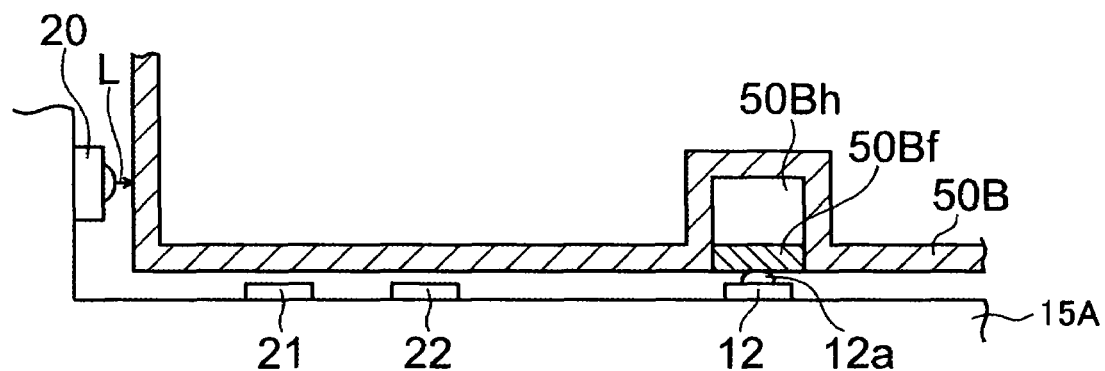
Figure 7B:
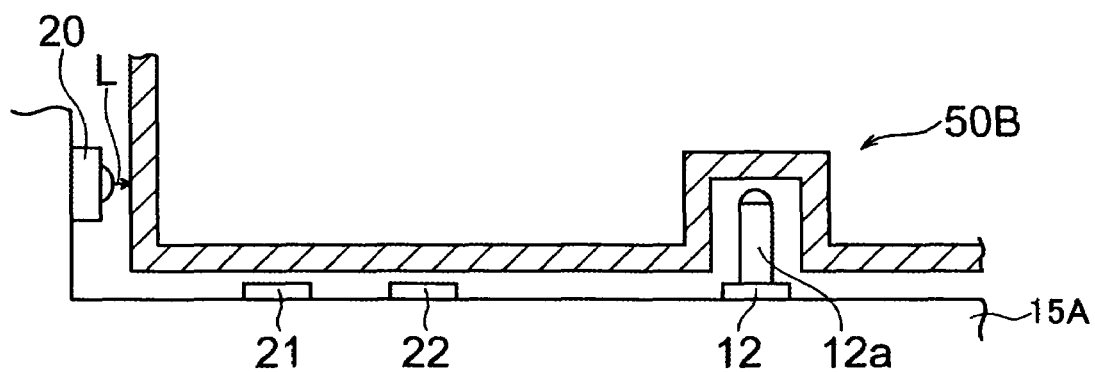

The discrimination hole 50Ch 3 is formed at the same position as the writing prohibition discrimination hole 50Bh formed on the current-used tape cassette 50B illustrated in FIG. 7A and FIG. 7B and has approximately the same shape with that of the writing prohibition discrimination hole 50Bh.

The light incident hole 50Ca introduces the LED light L output from the light emission element 20 into the new tape cassette 50C, so that it irradiates a reflection surface 50Cma of the reflection member 50Cm.

The reflection member 50Cm is fixed to the slide member 50Cp. The reflection member 50Cm deflects the direction of the incident LED light L to the substantially vertical direction by the reflection surface 50Cma.

The slide member 50Cp is provided being able to move in the directions of arrows A1 and A2 and has an operation portion 50Cpa projecting outside of the new tape cassette 50C.

The slide member 50Cp sets to permit data writing to the new tape cassette 50C when moved in the arrow A1 direction, while sets to prohibit data writing to the new tape cassette 50C when moved in the arrow A2 direction.

The emission hole 50Ch 1 is arranged above the light reception element 21 and guides the LED light L reflected on the reflection surface 50Cma of the reflection member 50Cm to the light reception element 21.

The emission hole 50Ch 2 is arranged above the light receiving element 21 and guides the LED light L reflected on the reflection surface 50Cma of the reflection member 50Cm to the light reception element 22.

As shown in FIG. 6A, the operation portion 50Cpa of the slide member 50Cp is moved in the arrow A1 direction. This position is a position of setting to permit writing to the new tape cassette 50C. At this time, the reflection surface 50Cma of the reflection member 50Cm positions above the emission hole 50Ch 1. As a result, the LED light L irradiates the light reception element 21.

As shown in FIG. 6B, the operation portion 50Cpa of the slide member 50Cp is moved in the arrow A2 direction. This position is a position of setting to prohibit writing to the new tape cassette 50C. At this time, the reflection surface 50Cma of the reflection member 50Cm positions above the emission hole 50Cha. As a result, the LED light L irradiates the light reception element 22.

FIG. 7A and FIG. 7B are sectional views showing an example of an arrangement relationship of the first writing prohibition detection switch 12 and the light reception elements 21 and 22 of the current-used tape cassette 50B, wherein FIG. 7A is a view showing a state of permitting data writing to the current-used tape cassette 50B, and FIG. 7B is a view showing a state of prohibiting data writing to the current-used tape cassette 50B.

Note that the outer appearance configuration of the current-used tape cassette 50B is the same as the configuration of the current-used tape cassette 50B in the first embodiment.

As is understood from illustrations of FIG. 7A and FIG. 7B, the LED light L from the light emission element 20 is blocked by a side surface of the current-used tape cassette 50B facing to the light emission element 20, so that neither of the light receiving elements 21 nor 22 is irradiated.

Figure 8:
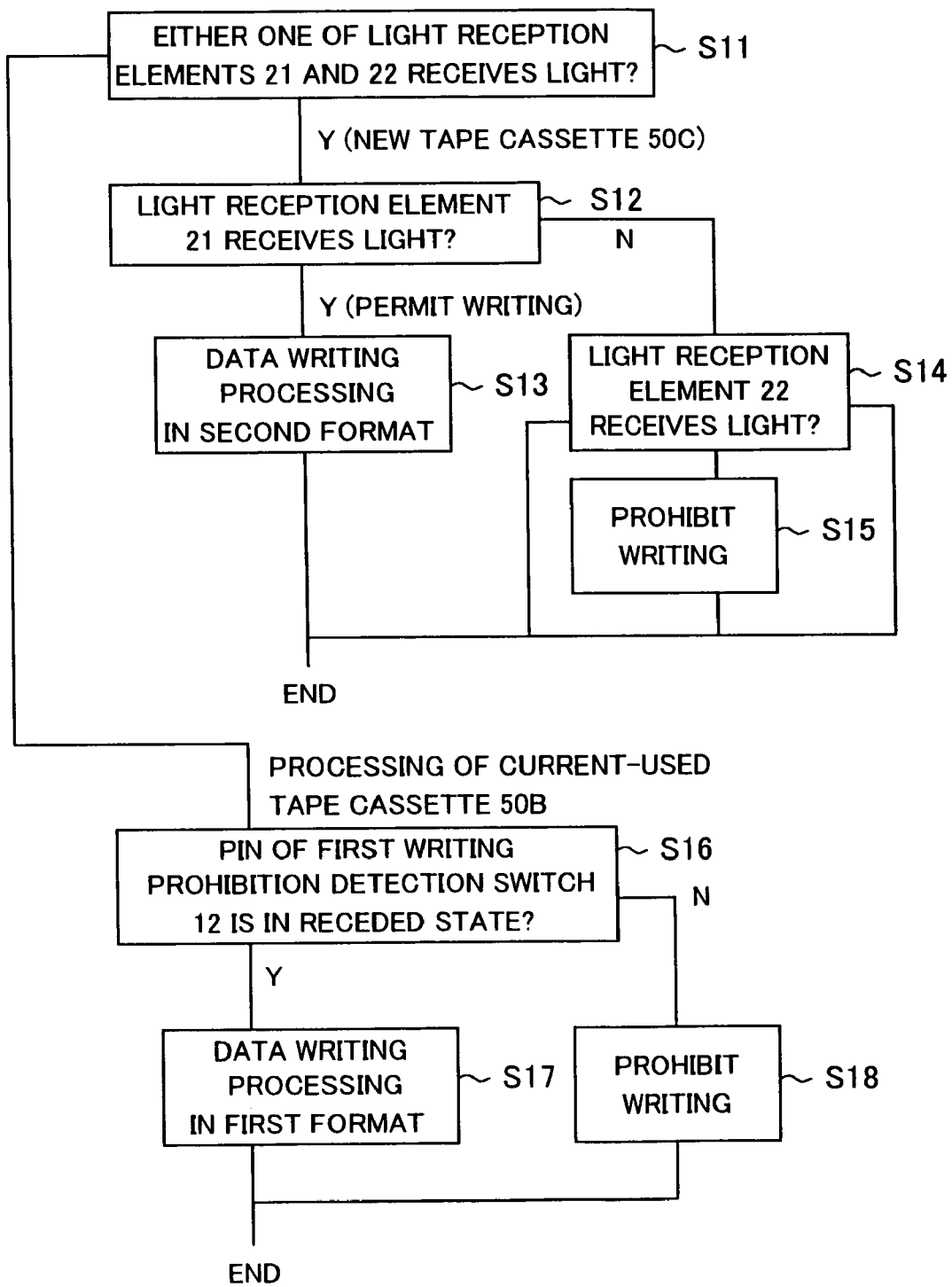
FIG. 8 is a flowchart showing operations of the second embodiment of the present invention.

FIG. 8 is a flowchart of operations of the second embodiment.

Step 11: The control circuit 5 of the recording/reproducing apparatus 1A identifies as a new tape cassette 50C when either one of the light reception elements 21 and 22 receives the LED L.

Step 12 to 13: The control circuit 5 judges that the new tape cassette 50C is in a state of permitting data writing when the light receiving element 21 receives the LED light L and controls the magnetic recording/reproducing circuit 3 so that data is recorded in the new (second) format on the magnetic tape 51 accommodated in the new tape cassette 50C.

Step 14 to 15: The control circuit 5 judges that the new tape cassette 50C is in a state of prohibiting data writing when the light receiving element 22 receives the LED light L and does not perform recording of data on the magnetic tape 51 accommodated in the new tape cassette 50C.

Step 16 to 18: The control circuit 5 identifies that a current-used tape cassette 50B is set in the recording/reproducing apparatus when neither of the light reception elements 21 nor 22 receives the LED light L, and when detected that the first writing prohibition detection switch 12 is in the state of permitting writing, the control circuit 5 controls the magnetic recording/reproducing circuit 3 to perform writing of data in the current-used format on the magnetic tape 51 accommodated in the current-used tape cassette 50B. When detected that the first writing prohibition detection switch 12 is in the state of prohibiting writing, the control circuit 5 does not perform data writing.

According to the second embodiment, by providing on the new tape cassette 50C the discrimination hole 50Ch 3 as same as the writing prohibition discrimination hole 50Bh formed on the current-used tape cassette 50B, recorded contents on the magnetic tape 51 accommodated in the new tape cassette 50C is not erroneously erased by the current-used format.

Furthermore, the new tape cassette 50C is identified by whether or not the light receiving elements 21 and 22 receives a light, and a hole formed on the tape cassette side, the second writing prohibition detection switch 10, the cassette detection switch 11, and other mechanisms and movable portions for identifying the new tape cassette 50C in the writing prohibition state become unnecessary, so that a mechanism for discriminating tape cassettes and detecting of writing prohibition can be simplified.

Third Embodiment

A recording/reproducing apparatus as a third embodiment of the present invention will be explained with reference to FIG. 9 to FIG. 12.

Figure 9:
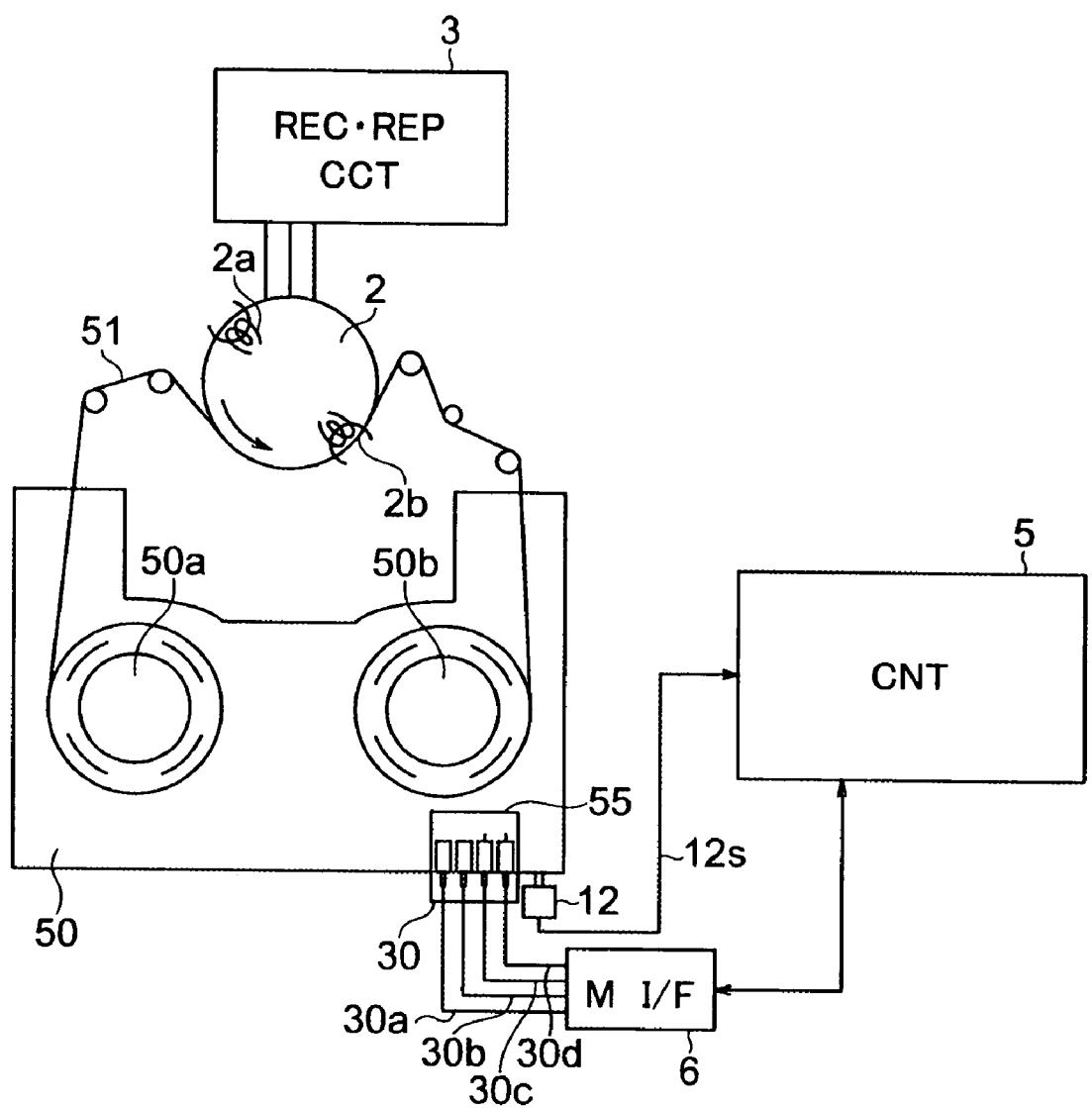
FIG. 9 is a view showing the schematic configuration of a recording/reproducing apparatus according to a third embodiment of the present invention.

FIG. 9 is a view showing the schematic configuration of the recording/reproducing apparatus according to the third embodiment of the present invention.

In FIG. 9, the same reference numbers are used for the same components as those in the recording/reproducing apparatus 1 in the first embodiment.

Different points of the configuration of the recording/reproducing apparatus 1C shown in FIG. 9 from the recording/reproducing apparatus 1 according to the first embodiment are that the recording/reproducing apparatus 1B is not provided with the second writing prohibition detection switch 10 and the cassette detection switch 11 but provided with a first writing prohibition detection switch 12.

The recording/reproducing apparatus 1B comprises a connection terminal 30 connected to an IC memory 55 incorporated in a tape cassette 50 and a memory interface 6 connected to the connection terminal 30.

There is known a so called MIC (memory incorporated cassette), wherein an IC memory made by a non-volatile semiconductor memory, such as an EEPROM, is built in. The IC memory in the MIC stores a recorded content, title, date, time, message, recording format, and index information of timer programming, etc. By reading the information stored in the IC memory, the contents stored in the IC memory can be confirmed without reproducing a magnetic tape 51 accommodated in the tape cassette 50. A maker option region is secured in the IC memory, on which a user can freely record various data.

In the third embodiment, an explanation will be made on a premise that the IC memory is incorporated in a tape cassette for a higher format.

The connection terminal 30 is connected to a power source line 30a, a serial data input line 30b, a serial data output line 30c and a ground line 30d and connected to a memory interface 6.

The memory interface 6 for connecting the IC memory 55 to the ground and supplying power to the IC memory 55 reads data recorded in the IC memory 55 as serial data to the control circuit 5 and transmits data to be recorded in the IC memory 55 as serial data from the control circuit 5 to the IC memory 55.

The control device 5 transmits data to be written in the IC memory 55 to the memory interface 6 and receives data read from the IC memory 55 by the memory interface 6.

Figure 10:
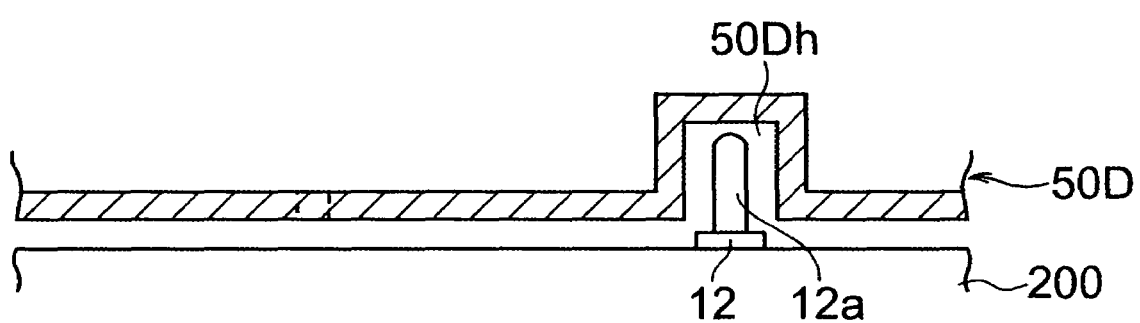
FIG. 10 is a sectional view of an example of an arrangement of an outer appearance of a new tape cassette accommodating a magnetic tape wherein data is written in a new format (first format) and the writing prohibition detecting switch in the third embodiment of the present invention.

FIG. 10 is a sectional view showing an example of a partial outer appearance of the new tape cassette 50D accommodating the magnetic tape 51, wherein data is recorded in the new format (first format) and an arrangement of the first writing prohibition detection switch 12.

As shown in FIG. 10, the new tape cassette 50D is formed on a side surface facing to (contacting) the first writing prohibition detection switch 12 an discrimination hole 50Dh in the same way as the writing prohibition discrimination hole 50Bh formed on the current-used tape cassette 50B shown as an example in FIG. 2A and FIG. 2B.

The new tape cassette 50D has entirely the same configuration as that of the current-used tape cassette 50B except that there is not a cap for opening or closing the discrimination hole 50Dh.

Recorded contents of the IC memory 55 incorporated in the new tape cassette 50D will be explained.

FIG. 11 is a view showing data in a specific address in the maker option region of the IC memory 55.

For example, assuming that the lowermost bit $a_0$ in an address "AAAA" has information for setting to prohibit writing to the new tape cassette 50D, writing is prohibited when the lowermost bit $a_0$ is "1" and writing is permitted when "0".

Also, assuming that the lowermost bit $b_0$ in an address "BBBB" has information for discriminating between the new tape cassette 50D and current-used tape cassette 50B, data is recorded on the magnetic tape 51 in the higher (first) format when the lowermost bit $b_0$ is "1" and in the current-used (second) format when "0".

Also, information of the lowermost bit $a_0$ of the address "AAAA" is rewritten in the recording/reproducing apparatus 1B, and information on the lowermost bit $b_0$ of the address "BBBB" is written to "1" before shipping of the new tape cassette 50D for setting to prohibit erasing.

Figure 12:
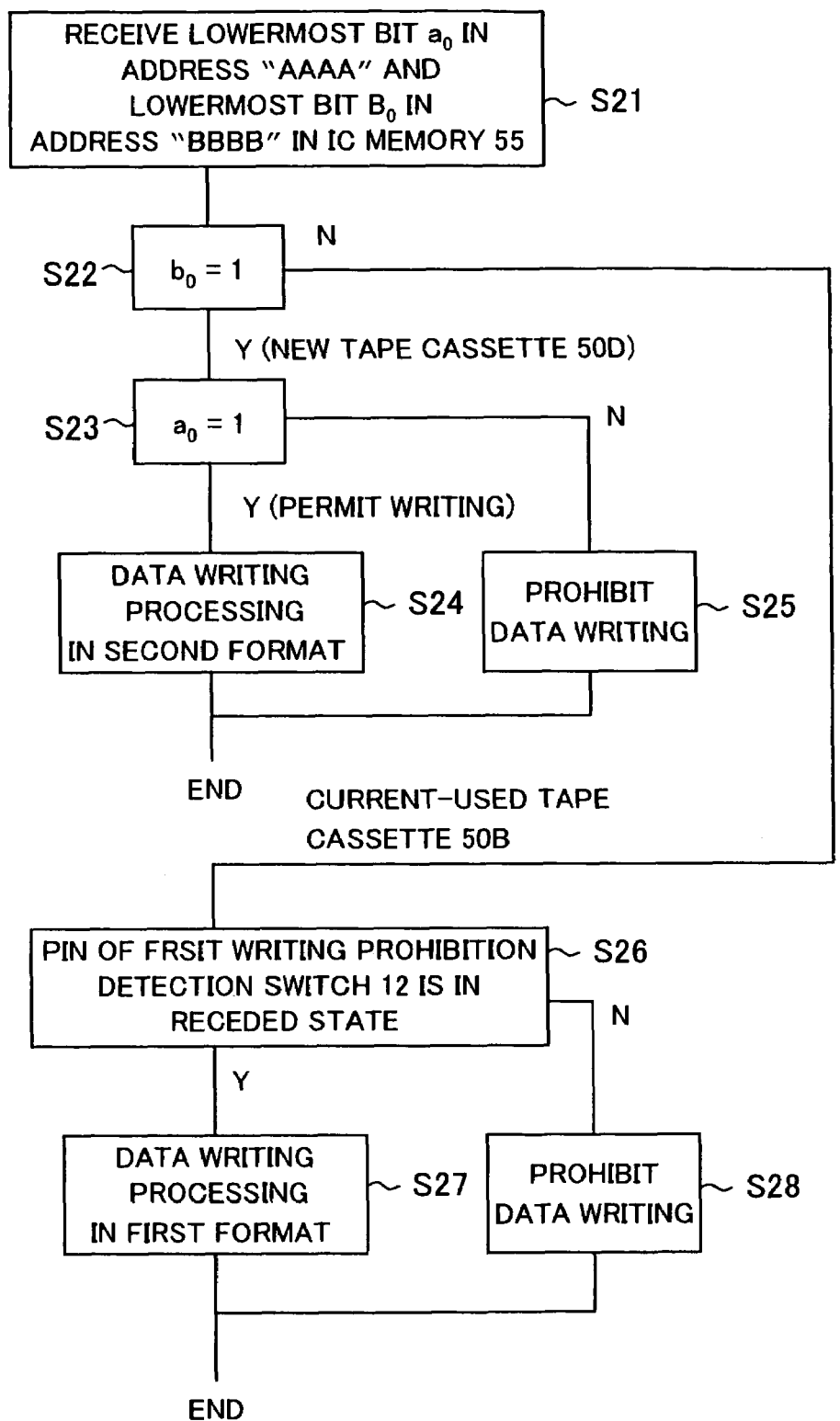
FIG. 12 is a flowchart showing operations of the third embodiment of the present invention.

FIG. 12 is a flowchart showing operations of a recording apparatus of the third embodiment.

Step S21: When a new tape cassette 50D having the above configuration is set in the recording/reproducing apparatus 1B, information in the lowermost bits $a_0$ and $b_0$ of the addresses "AAAA" and "BBBB" of the IC memory 55 is transmitted to the control circuit 5 via the memory interface 6, so that the control circuit 5 receives the information as it is.

Step 22: The control circuit 5 identifies if it is a new tape cassette 50D or a current-used tape cassette 50B from the information in the lowermost bit $b_0$ of the address "BBBB".

Step 23 to 25: The control circuit 5 detects if it is prohibited to write to the new tape cassette 50D from the information of the lowermost bit $a_0$ of the address "AAAA".

When the information on the lowermost bit $a_0$ of the address "AAAA" is "0", it indicates a writing permission state, so that the control circuit 5 performs data recording in the new format on the magnetic tape 51 accommodated in the tape cassette 50D via the magnetic recording/reproducing circuit 3 and the rotation drum 2. When the information on the lowermost bit $a_0$ is "1", the control circuit 5 performs processing of prohibiting data writing.

Step 22, 26 to 28: When the current-used tape cassette 50B is set in the recording/reproducing apparatus 1B, the control circuit 5 identifies that it is a current-used tape cassette 50B from the information on the lowermost bit $b_0$ of the address "BBBB". Then, the control circuit 5 controls the magnetic recording/reproducing circuit 3 and the rotation drum 2, so that data recording in the current-used format is performed on the magnetic tape 51 accommodated in the current-used tape cassette 50B in accordance with a state of a detection signal of the first writing prohibition detection switch 12. Namely, when the pin 12a of the first writing prohibition detection switch 12 is in the receded state, data writing processing in the current-used format is performed, while data writing is prohibited in an inverse case.

As explained above, according to the third embodiment, by storing discrimination information of a tape cassette and writing prohibition information of a new tape cassette 50D in advance in the IC memory 55 incorporated in the tape cassette 50 (a current-used tape cassette 50B or a new tape cassette 50D) and detecting the information by the control circuit 5 of the recording/reproducing apparatus 1B, data recording on the magnetic tape 51 accommodated in the new tape cassette 50D or data writing on the magnetic tape 51 accommodated in the current-used tape cassette 50B can be performed.

Also, since the new tape cassette 50D is provided with a writing prohibition discrimination hole 50Dh, there is no erroneous erasing of rewriting information recorded on the magnetic tape 51 accommodated in the new tape cassette 50D by a current-used format.

Note that the recording/reproducing apparatuses explained in the above embodiments are configured to be able to record to both of a tape cassette wherein data is recorded in the new (second) format and a tape cassette wherein data is recorded in the current-used (first) format, but it can be also applied to a recording/reproducing apparatus capable of recording only to a tape cassette wherein data is recorded in the new format. In this case, when a current-used tape cassette 50B is detected in the recording/reproducing apparatus (control circuit 5), a tape cassette ejection mechanism (not shown) is driven by the control circuit 5 and the current-used tape cassette 50B is automatically ejected from the recording/reproducing apparatus.

In the above embodiments, an explanation was made on the case where a magnetic tape was used as a recording medium and a tape cassette was used as a cassette, but when applying the present invention to a recording apparatus, a magnetic disk as a recording medium and a cassette for accommodating a magnetic disk as a cassette and other recording media and cassettes for accommodating the recording medium can be adopted.

In the recording apparatus of the present invention, a cassette having the same shape and same dimensions as those of the current-used cassette can be used, and data can be recorded in a recording medium accommodated in either of the cassettes for recording data in the new format and in the current-used format.

In the recording/reproducing apparatus of the present invention, the mechanism for discriminating a cassette and the configuration are minimized.

According to the recording/reproducing apparatus of the present invention, data recorded in the new format on a recording medium is not erroneously erased by the current-used format by a current-used recording apparatus.

The invention claimed is:

1. A recording apparatus for discriminating whether a set recording medium is in a first cassette for recording data in a first format or in a second cassette for recording data in a second format, comprising:

a cassette type detection means for detecting said first cassette or said second cassette;

a first writing prohibition detection means for detecting whether to permit to record data in the first format on said recording medium accommodated in said first cassette or said second cassette;

a second writing prohibition detection means for detecting whether to record data in the second format on said recording medium accommodated in said first cassette or second cassette;

a control means; and a data recording means, wherein said control means discriminates whether a cassette set in the recording apparatus is said first cassette or said second cassette from a detection signal of said cassette type detection means, performs data recording on said recording medium in the first format via said data recording means in the case where a detection signal of said first writing prohibition means permits to write data on said recording medium when said first cassette is set, and performs data recording on said recording medium in the second format via said data recording means in the case where a detection signal of said second writing prohibition means permits to write data on said recording medium when said second cassette is set, wherein said first cassette and said second cassette comprise a first hole for indicating whether said first writing prohibition detection means permits to record data in said first format on said recording medium, wherein said first writing prohibition detection means has a switch having a first pin able to be inserted to said first hole and outputs an on or off detection signal in accordance with whether said first pin is inserted to said first hole, wherein said first hole is closed when indicating permission of recording data in said first format on said recording medium, so that said first pin of said first writing prohibition detection means is prohibited to be inserted to said first hole, wherein said first hole is open when indicating prohibition of recording data in said first format on said recording medium, so that said first pin of said first writing prohibition detection means is permitted to be inserted to said first hole, wherein said cassette type detection means and said second writing prohibition detection means are first and second light reception elements arranged by leaving a predetermined space, wherein a light emission element for emitting a light able to be received by said first and second light reception elements is further provided, wherein said second cassette is formed a light incident hole for receiving an incident light from said light emission element and first and second emission holes formed at positions corresponding to said two light reception elements, wherein said second cassette comprises a deflection means for deflecting a light introduced from said light emission element to said light incident hole in the direction of said two light reception elements and a moving means for deflecting the light introduced from said light emission element to said light incident hole in the direction of one of said two light reception elements by moving the deflection means, wherein said first cassette does not have said emission hole and produced to be opaque, and wherein said control means identifies that a second cassette is set in the recording apparatus when either of said first and second light reception elements receives a light, and performs data recording in the second format on said recording medium via said data recording means when said first light receiving element detects light reception.

2. A recording apparatus as set forth in claim 1, wherein:

said second cassette comprises a second hole for indicating that it is a second cassette and a third hole for indicating whether to permit to record data in said second format on said recording medium;

said first cassette is not formed said second hole at a part where said second hole is formed on said second cassette, and said first cassette is not formed said third hole at a part where said third hole is formed on said second cassette;

said second writing prohibition detection means has a switch having a third pin able to be inserted to said third hole and outputs an on or off detection signal in accordance with whether said third pin is inserted to said third hole;

said third hole is closed when indicating permission of recording data in said second format on said recording medium, so that the third pin of said second writing prohibition detection means is prohibited to be inserted to said third hole;

said third hole is open when indicating prohibition of recording data in said second format on said recording medium, so that the third pin of said second writing prohibition detection means is permitted to be inserted to said third hole; and said control means identifies that said second cassette is set in the recording apparatus when receiving as an input a signal detecting that a second pin of said cassette type detection means is inserted to said second hole, and identifies that said first cassette is set in the recording apparatus when receiving as an input a signal detecting that said second pin of said cassette type detection means is not inserted in said second hole, and when a detection signal of said second writing prohibition detection means permits to record data when said second cassette is set, data recording in the second format is performed on said recording medium via said data recording means.

3. A recording apparatus as set forth in claim 1, wherein:

said cassette type detection means and said second writing prohibition detection means are first data recorded on a first address and a second data recorded on a second address in a semiconductor memory installed in said first cassette and said second cassette;

a reading means for reading said first address and second address recorded on said semiconductor memory is further provided; and said control means identifies a cassette set in the recording apparatus is a first cassette when said first data is on, and performs recording processing of data in the second format when said second data is on.

4. A recording medium accommodation cassette, having similar dimensions as those of a first recording medium accommodation cassette for accommodating a recording medium to be recorded data in a first format, comprising:
- a first discrimination hole provided at the same position as a writing prohibition setting means provided to said first cassette, having a writing prohibition state; and
- a discrimination means for discriminating from said first cassette and indicating permission and prohibition of writing to said recording medium accommodation cassette, wherein said discrimination means comprises:
- a light incident hole to which a light emitted from a recording apparatus is irradiated;
- a reflection member for reflecting said emitted light and selectively sliding between a first position and a second position;
- a first emission hole for emitting said reflected light when said reflection member is slid to said first position; and
- a second emission hole for emitting said reflected light when said reflection member is slid to said second position, and wherein discrimination from said first cassette and permission or prohibition of writing to said recording medium accommodation cassette are indicated by from which of the first and second emission holes said light is emitted.

5. A recording medium accommodation cassette as set forth in claim 4, further comprising:
- a second discrimination hole used for discriminating from said first cassette; and
- a third discrimination hole for indicating prohibition of writing to said recording medium accommodation cassette by being selectively open or closed.

* * * * *